July 17, 1934.  W. G. STONE  1,966,938
METHOD OF DISTILLATION
Filed July 14, 1928  3 Sheets-Sheet 1
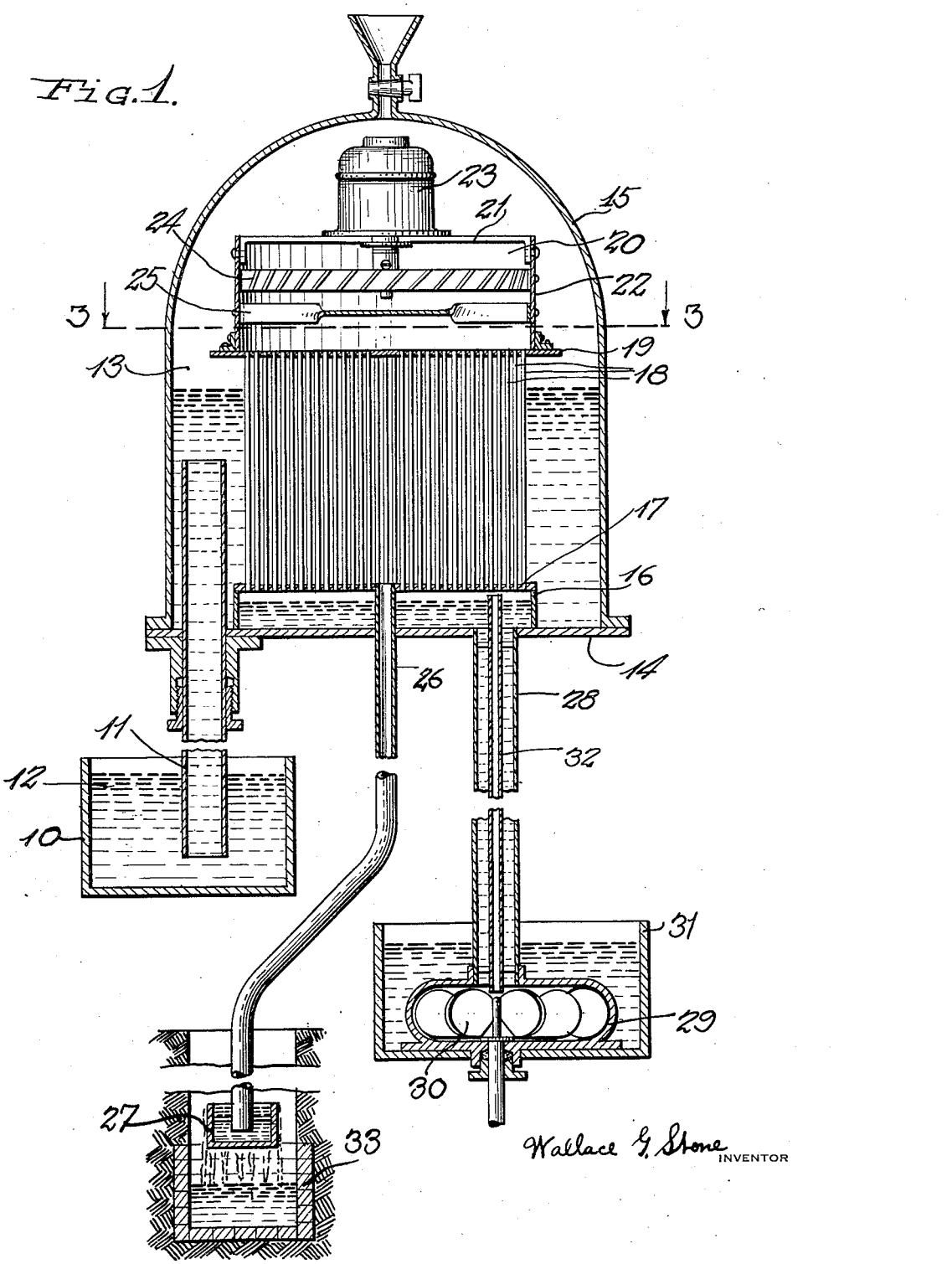

July 17, 1934. W. G. STONE 1,966,938
METHOD OF DISTILLATION
Filed July 14, 1928   3 Sheets-Sheet 2
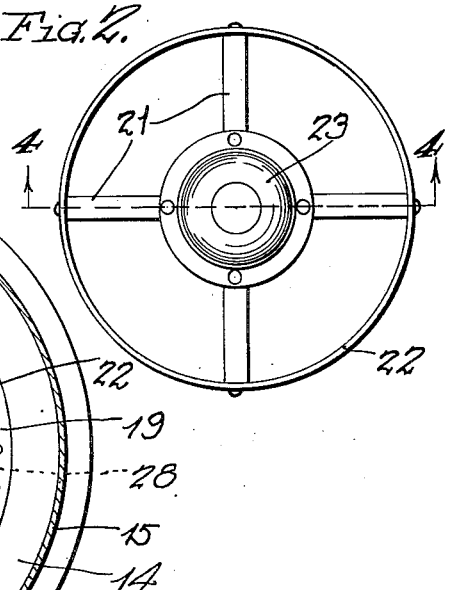
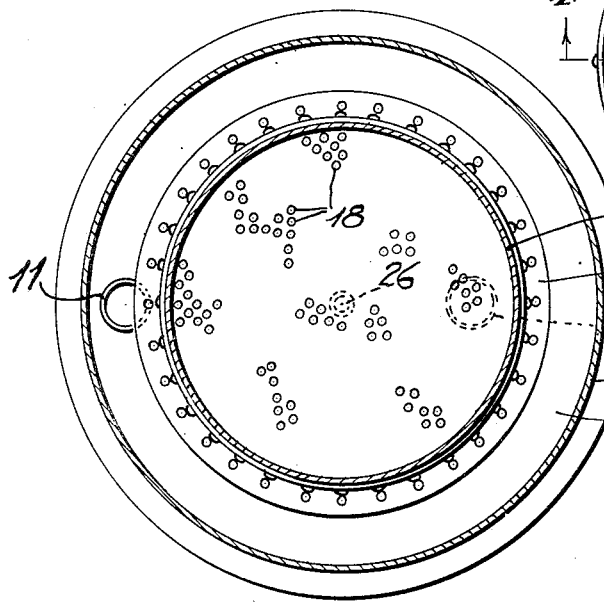
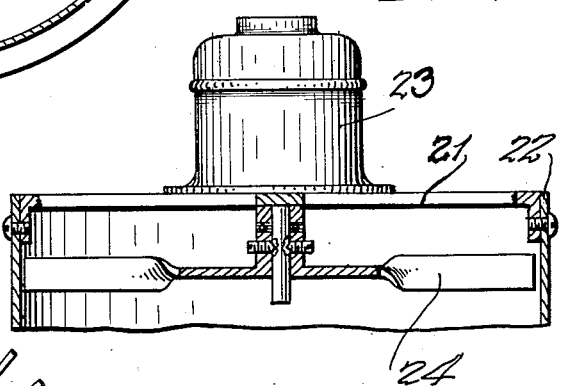
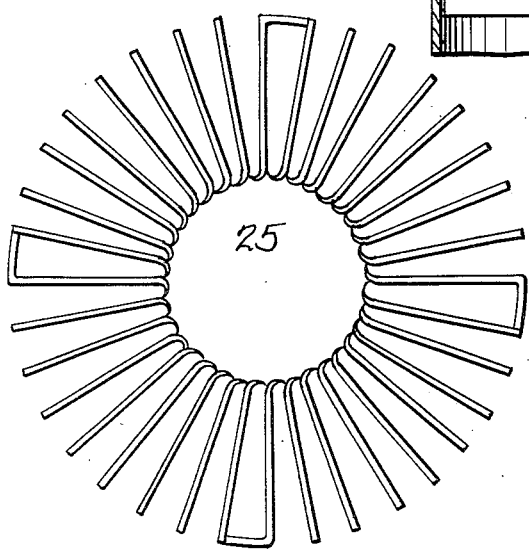
Wallace G. Stone INVENTOR July 17, 1934.  W. G. STONE  1,966,938
METHOD OF DISTILLATION
Filed July 14, 1928  3 Sheets-Sheet 3
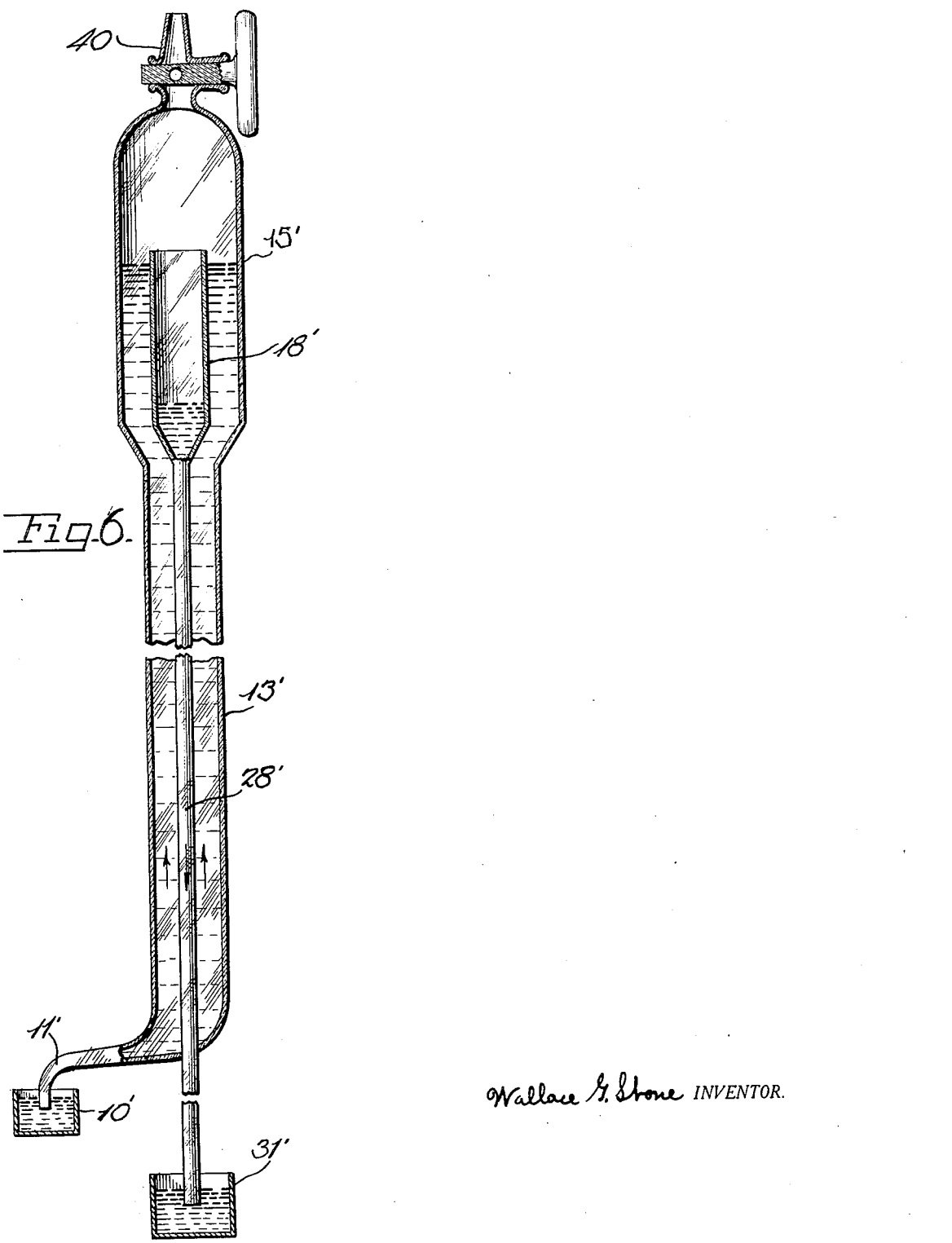

Patented July 17, 1934

1,966,938

UNITED STATES PATENT OFFICE 1,966,938

METHOD OF DISTILLATION

Wallace G. Stone, St. Joseph, Mo.

Application July 14, 1928, Serial No. 292,886

1 Claim. (Cl. 202—75)

This invention relates to that class of devices used in the distillation of substances. It is of such a nature that it may be operated at any convenient temperature and is particularly adapted to the operation of distilling at near room temperature. This feature is particularly important in the conservation of expensive energy thus made possible.

In the art of the past, the loss of heat energy thru dissipation from the heated portions of the apparatus has seemed to be unavoidable. Efforts to reduce this loss by the use of heat insulation means are at best quite unsatisfactory. By the use of the present invention, this energy loss may, if desired, be almost totally eliminated and other disadvantages seemingly inherent in the very nature of distillation are completely avoided.

One object of the invention is to distill water or other substance without adding to the system any energy from an outside source except that required to overcome the purely physical resistances of the system and the small amount of energy needed to replace the free energy of dilution of the dissolved substances in the original substance.

It is a further object of the invention to make it economically possible to distill water prior to consumption in the home or use in industry where impurities constitute a source of expense, danger or annoyance, such as use in dyeing, brewing, washing, and steam production.

It is a further object of this invention to provide a means and a method whereby distillations or concentrations, etc., may take place at a temperature which will best avoid possible injury to the liquor, distillate or vapor, or any undesirable transformations or decompositions thereof that may be instituted or accelerated by another temperature.

It is a further object of this invention to provide a means and method whereby distillations, concentrations, etc., may be made at such a temperature and pressure as may be desired for reasons such as rendering the thermal transfer within the device the most efficient possible.

It is a further object of the invention to advantageously use the following fact: At lower temperatures, a given variation of vapor pressure induced by a change of temperature corresponds to a greater temperature change.

It is a further object of the invention to distill substances at such a temperature and pressure as will best form the desired distillate and leave the desired residue. In this connection, it may be mentioned that at different temperatures, the difference between the vapor pressures of unlike substances varies considerably.

To accomplish the ends desired, it is a further object of this invention to provide a means which is simple, inexpensive to make and operate, and of large capacity for the capital expenditure.

Further objects will be apparent from the following disclosure and claim. It is to be noted that I do not wish to limit myself to the specific embodiments disclosed except as limited by the appended claim.

In the operation of a standard form of distilling or concentrating mechanism, heat, or energy in some form is given to the evaporating substance to supply at least a considerable portion of the energy known as the heat of vaporization of the substance and to replace all losses due to radiation, friction, the usually higher temperature of the condensed substances than the substances introduced, etc.

In the known devices where there is a partial conservation of the heat of vaporization, the unavoidable losses, such as thru radiation, etc., render them commercially impracticable.

By the use of my invention, it is possible to avoid these multifarious expenses and losses and it will be possible and profitable to distill substances for many uses where the cost of the more desirable purified substance is prohibitive under present conditions.

In order to effect a vaporization of a liquid with desirable rapidity, it is necessary that the internal vapor pressure of the fluid be higher than the pressure of gas upon it. This condition may be had by increasing the internal pressure or by decreasing the external gaseous pressure.

The present invention is of such a nature that the material to be evaporated may be introduced at any desired temperature and the operation may be made to take place continuously without the necessity of adding or subtracting any heat to any part of the mechanism. Losses and gains in heat energy are intrinsically compensated for within wide limits. The means wherein the invention is capable of practice may be summarized briefly as follows:

The substance to be distilled, or to be concentrated by distillation, is introduced into a chamber or a portion of a chamber where the vapor pressure is such that evaporation will take place at a temperature very close to the temperature of the substance as introduced. The gas evolved is then condensed in another chamber or portion of a chamber, which is so related to the first chamber or first portion of chamber that the heat of vaporization will be supplied by the heat of condensation of the substance just preceding.

In the drawings, I have illustrated three forms of apparatus in which the invention may be practiced.

Fig. 1 shows in vertical cross section the preferred form of apparatus.

Fig. 2 is a top view of a portion of the device.

Fig. 3 is a section on the line 3—3 of Fig. 1.

Fig. 4 is a section on the line 4—4 of Fig. 2.

Fig. 5 is a detail view showing a plan view of a baffle used in the modification shown in Fig. 1.

Fig. 6 shows in vertical cross section a very simple form of apparatus in which the invention may be practiced.

In Fig. 1, 10 is a container for a fluid to be distilled. 11 is a pipe leading from below the surface of a liquid 12 within said container 10 through a base 14 into a chamber 13 enclosed by a bell jar 15. Within the chamber 13 supported upon the base 14 is a drum shaped receptacle 16 tightly secured as by brazing to the base 14. Through the upper flat side 17 of said drum 16 extend numerous small tubes 18. The upper ends of these tubes 18 lead through a plate 19 into an open top chamber 20. The side wall 22 of chamber 20 supports by means of a spider 21 an electric motor 23. Upon the lower end of the shaft of the motor 23 is secured a fan 24. Within the chamber 20, likewise supported from the side wall 22, is a baffle means 25 to lessen the swirl of vapor below the fan 24.

The motor and fan are so related as to cause a flow of vapor downwardly from the fan upon actuation of the motor.

At approximately the center of the battery of tubes 18 a number of tubes are omitted and in the space left thereby is fixed a pipe 26 extending through the drum 16 to the upper surface of the plate 17. The pipe 26 extends downwardly into a well (or if desired into a pump, not shown), and into a trap 27. The amount of flow out thru this pipe may be controlled by any means such as a valve, not shown. The distance vertically from the surface of the liquid in the chamber 13 to the surface of the liquid in the trap 27 should exceed the length of a column of that liquid which atmospheric pressure is able to sustain.

Through the base 14 into the drum 16 extends a pipe 28 of approximately the same diameter as pipe 11. The lower end of this pipe leads to the inlet of a pump 29 which may be as shown, a rotary pump having impeller blades 30 and may, if desired be immersed in the liquid within a container 31. The pump outlet may if desired, be directly into the liquid within container 31. Within the pipe 28 and supported thereby, is a smaller pipe 32 which at its upper end stops just short of the plate 17 and at its lower end just short of the blades 30.

In the operation of this device, the liquid to be distilled is contained within a means 10 and is caused to flow by atmospheric pressure into the chamber 13. The chamber 13 is at the pressure or very close to the pressure of the internal vapor pressure of the liquid 12 within the container 10. Flow of the liquid 12 through the pipe 11 is so controlled that under conditions of operation the level of the liquid in the chamber 13 remains below the plate 19. This may be done by using a valve (not shown), by lowering the container 10 (and if necessary lengthening the pipe 11), by regulating the rate of vaporization or by any other means; which may if desired be controlled by automatic means such as a float upon the surface of the liquid within the chamber 13.

The motor 23 operates the fan 24 so as to cause a higher vapor pressure within the tubes 18 than outside said tubes.

The tubes 18 are thin walled and are of copper or the like so that heat will readily flow from the higher temperature inside to the lower temperature without.

If this method is used to distill water at 20° C. the internal vapor pressure will be 17.363 mm. of mercury. The pressure of vapor within the chamber 13 will be, due to fan 24, slightly less than this. If the fan 24 is capable of maintaining a difference in pressure within the tubes and without the tubes, such that the pressure within the tubes is, for instance 26.471 mm. of mercury when without the tubes the pressure is 17.363 mm. of mercury, then the temperature induced by the condensation of the vapor within said tubes will be about 27° and without the tubes will be about 20°. It will thus be noticed that a difference in pressure of less than 10 mm. of mercury corresponds to a difference in temperature of vaporization of the water of 7° C. when working at about 20° C.

With such a slight difference in pressure, it will be possible to construct the tubes 18 with very thin and highly heat conductive walls so that if the fan 24 is capable of maintaining the difference in pressure as indicated, the flow of heat from within the tubes to without the tubes will be extremely rapid. In practice, it will probably be found preferable to maintain a small difference in pressure and construct the tubes with correspondingly thin walls capable of holding such pressure without danger of rupture.

The pump 29 is so designed and placed that it will withdraw the condensed fluid as fast as formed from the drum 16 where such fluid will flow from the inside of the pipes 18. If desired, incondensible vapors which may collect within the drum 16 may be removed by the use of suction means such as provided by the pipe 32 whose lower end stops just short of the blades 30.

As the liquid evaporates within the chamber 13, it will flow inwardly toward the center of the battery of tubes 18 and due to its increasing specific gravity caused by the dissolved or precipitated impurities, it will collect above and around the drum 16. Due to the fact that the pipe 26 extends downwardly into the trap 27 such a distance that the atmospheric pressure is unable to maintain this length of column, there will be a flow of the heavy liquor or sludge into the well 33.

If the heavy liquor is a valuable substance, the operation may be modified as by leading the outer end of the pipe 26 to the inlet of a pump capable of removing it from the chamber 13. This may be similar in design to the pump 29.

If it is found desirable, the liquid 12 may be deaerated or degasified by some means not shown prior to its introduction into container 10. In this case, or in case the untreated liquor contains very little dissolved gas, the pipe 32 may be omitted.

In the modification shown in Fig. 6, 10' is a container for liquid to be distilled, 11' is a means communicating from below the surface of the liquid within the container 10' to a column of liquid held by cylinder 13' which leads to an enlarged cylindrical head 15' which forms a sealed chamber when stop-cock 40 is closed.

Within the head 15', there is an open top cylinder 18' which at its lower end merges into a vertical tube 28', which emerges from the lower end of the cylinder 13' and extends below the surface of liquid within a container 31'.

The height of the column from the container 10' to the head 15' is such that under conditions of operation, the liquid surface will be below the open top of cylinder 18'. The level of the liquid within the container 31' is held so that the column within the cylinder 18' extends only to a height appreciably lower than the surface of the liquid without the cylinder 18'.

To start the operation of the device, air may be exhausted from the device through the port of stopcock 40 until practically all of the air has been replaced by the vapor of the liquid to be distilled. During the evacuation, the end of tube 28' may be immersed in previously purified liquid within the container 31' and the end of the means 11' may be immersed in impure liquid to be distilled.

The column of vapor extending from the liquid surface within the cylinder 18' to the level of the liquid surface without said cylinder has of course appreciable weight.

Assuming the temperature at any starting point to be the same within and without the cylinder, the vapor pressure within the liquids should be very nearly identical at the surface of either column. The pressure of vapor pressing upon the surface will however be greater within the tube than without the tube by an amount equal to the weight of the column of vapor heretofore specified. Condensation will therefore take place at the inner surface until a temperature rise is induced at which the vapor pressure of the liquid within the cylinder is greater than the vapor pressure of the liquid without the cylinder by an amount approaching the weight of the column of vapor.

However, as the walls of the cylinder 18' may be made highly conductive and by suitable form may be made of large area, as for instance by breaking up into many small tubes as is done in the modification shown in Fig. 1, the conduction of heat outwardly may be made fairly rapid even when the temperature difference is very slight.

In the specification and claim where I use the term distilling, it is to be understood that I include thickening, fractionating, refluxing, subliming, etc., as well as simple distillation.

Many modifications may of course be made without departing from the spirit of the invention.

What I claim as new and desire to protect by Letters Patent is:

A process of distillation comprising using mechanical energy to institute and effect vaporization, such energy being the only effective energy supplied to the system, compressing and condensing the vapors formed in heat exchange relation with the body of liquid being evaporated.

WALLACE G. STONE.